Patented Sept. 4, 1928.

1,683,404

UNITED STATES PATENT OFFICE.

IWAN OSTROMISLENSKY, OF NEW YORK, N. Y., ASSIGNOR TO THE NAUGATUCK CHEMICAL COMPANY, OF NAUGATUCK, CONNECTICUT, A CORPORATION OF CONNECTICUT.

POLYMERIZED STYROL AND ITS HOMOLOGUES AND PROCESS FOR THE POLYMERIZATION OF STYROL AND ITS HOMOLOGUES.

No Drawing. Original application filed July 12. 1924, Serial No. 725,658. Divided and this application filed January 30, 1925. Serial No. 5.894.

This invention relates to polymerized styrol and its homologues and to processes for the polymerization of styrol and its homologues.

This application is a division of my copending application Serial No. 725,658, filed July 12, 1924.

The object of this invention is to obtain modifications of products known as polymerized $ArCH:CH_2$, where Ar is aryl. A further object is to produce modifications of polymerized styrol, designated herein as gamma meta styrol. This product resembles celluloid and "Bakelite" in some respects, but possesses certain properties not shared by these. It differs from celluloid in its freedom from high combustibility, which property is an outstanding disadvantage in celluloid. The products of this invention are transparent, resembling ordinary glass, and have a high index of refraction.

This application is a continuation in part of application Serial No. 648,803, filed June 30, 1923, and describes among others products which may result from the process described in my copending application Serial Nos. 711,584 and 711,585, both filed May 7, 1924. The application Serial No. 648,803, filed June 30, 1923 describes the polymerization of crude styrol, depolymerizing the solid product thus obtained, removing impurities, and repolymerizing the purified styrol recovered therefrom. This application also includes depolymerizing waste meta styrol for purposes of utilizing the styrol therein. The application Serial No. 711,584 is a continuation in part of Serial No. 648,803 and is concerned with the polymerization of an impure styrol to a brittle product, depolymerizing the brittle product, and separating the majority of non-styrol hydrocarbons, and repolymerizing the styrol portion to a tough transparent product. Application Serial No. 711,585 describes a method for obtaining a tough, transparent polymerized styrol from a styrol solution or mixture which contains at least 40% of unpolymerized styrol by polymerizing at 135–200° C. with access of air.

The invention broadly comprises processes for making the gamma modification of meta $ArCH:CH_2$, and specifically relates to processes for the preparation of gamma meta styrol. The invention also relates to polymerization of organic compounds in the presence of "accelerators" such as peroxides. It includes the products formed by these processes.

Generally speaking, the gamma modification results from the polymerization of $ArCH:CH_2$ compounds in the presence of peroxides, especially organic peroxides.

*Example I.*—As a specific example, 1 gram of benzoyl peroxide is dissolved in 100 grams of styrol, and the solution is heated for 1–1½ hours at 175°–180° C. The styrol is completely polymerized to form a transparent solid.

*Example II.*—The benzoyl peroxide may be replaced in Example I by 2 grams of triphenylmethyl peroxide. When the styrol solution is heated as in Example I, it polymerizes to a solid mass. If desired, benzoyl peroxide and triphenyl methyl peroxide may be used simultaneously.

These peroxides are soluble in styrol, and therefore lend themselves readily to use. Under certain conditions, however, it is possible to employ insoluble peroxides, as for example, barium peroxide. In such cases, the gamma modification is formed, but only where the insoluble peroxide is in contact with the styrol, as for example, at the bottom of the polymerizing vessel. Obviously, when insoluble peroxides are employed, means must be taken to bring about the maximum contact of peroxide and styrol.

Gamma meta styrol is a transparent, brittle substance which in thick layers has a yellowish color which displays a high coefficient of light dispersion. It does not become cloudy when kept for some time. Its fracture is shiny and lustrous. It may not be readily cut, sawed, planed or polished. When cut with a knife it splits quite readily into small grains. The surface of the cut is shiny and pitted. When struck with a hammer gamma meta styrol cracks quite easily. It can be ground to a powder in a porcelain mortar with great ease. Upon cooling after complete polymerization it detaches itself from the sides of the glass vessel in which it was polymerized without breaking it, but gives deep cracks inside the mass often splitting into several pieces. Upon being subjected to 100° C. it becomes increasingly more plastic and gradually loses its shape. It has a transverse tensile strength of 1,000 lbs. per sq. inch. In solution it does not decolorize a 3% solution of bromine at 0° C. The substance is substantially free from unpolymerized styrol.

As many apparently widely different embodiments of this invention may be made without departing from the spirit thereof, it is to be understood that I do not intend to limit myself to the specific form of the invention as set forth except as indicated in the appended claims.

Having thus described my invention, what I claim and desire to protect by Letters Patent is:

1. A process for making gamma meta ArCH:$CH_2$, where Ar represents aryl, which comprises treating ArCH:$CH_2$ with a peroxide.

2. A process for making gamma meta styrol which comprises treating styrol with a peroxide which is soluble therein.

3. A process for making gamma meta styrol which comprises heating styrol with a peroxide for 1–1½ hrs. at approximately 175°–180° C.

4. A process for making gamma meta styrol which comprises heating styrol with an organic peroxide for 1–1½ hrs. at approximately 175°–180° C.

5. A process for making gamma meta styrol which comprises polymerizing styrol in the presence of benzoyl peroxide.

6. As new compounds the gamma meta styrols, transparent substances having a shiny lustrous fracture, quite easily reduced to powder, split easily when subjected to a blow, and having a high coefficient of light dispersion, said compounds being substantially free from unpolymerized styrols.

Signed at Cromwell, Connecticut, this 26th day of January, 1925.

IWAN OSTROMISLENSKY.